United States Patent [19]
Corkill et al.

[11] 4,274,975
[45] Jun. 23, 1981

[54] DETERGENT COMPOSITION

[75] Inventors: John M. Corkill, Wyoming; Bryan L. Madison, Cincinnati; Michael E. Burns, Fairfield, all of Ohio

[73] Assignee: The Procter & Gamble Company, Cincinnati, Ohio

[21] Appl. No.: 67,867

[22] Filed: Aug. 20, 1979

Related U.S. Application Data

[60] Division of Ser. No. 450,266, Mar. 11, 1974, which is a continuation-in-part of Ser. No. 359,293, May 11, 1973, abandoned.

[51] Int. Cl.$^3$ .............. B01J 1/04; C02F 1/42; C11D 3/12; C11D 3/14
[52] U.S. Cl. .............. 252/140; 252/131; 252/174.25; 252/179; 423/328; 423/329
[58] Field of Search .............. 252/131, 140, 174.25, 252/179, 95; 423/328, 329

[56] References Cited

U.S. PATENT DOCUMENTS

| | | | |
|---|---|---|---|
| 2,882,243 | 4/1959 | Milton | 252/455 Z |
| 3,033,641 | 5/1962 | Thomas | 423/328 |
| 3,112,176 | 11/1963 | Haden | 423/329 |
| 3,154,494 | 10/1964 | Speak | 252/96 |
| 3,254,034 | 5/1966 | Dwyer | 252/430 |
| 3,424,545 | 1/1969 | Bauman | 8/137 |
| 3,661,789 | 5/1972 | Corey | 252/186 |
| 3,755,180 | 8/1973 | Austin | 252/99 |
| 3,812,044 | 5/1974 | Connor | 252/89 |

FOREIGN PATENT DOCUMENTS

| | | | |
|---|---|---|---|
| 2055423 | 5/1972 | Fed. Rep. of Germany | 252/558 |
| 2516116 | 10/1975 | Fed. Rep. of Germany | 252/131 |
| 662948 | 4/1964 | Italy . | |
| 26-1119 | 3/1951 | Japan | 252/131 |
| 28-1681 | 4/1953 | Japan | 252/130 |
| 33-5244 | 7/1958 | Japan | 252/117 |
| 1507703 | 4/1978 | United Kingdom | 252/131 |

*Primary Examiner*—Dennis L. Albrecht
*Attorney, Agent, or Firm*—Robert B. Aylor; Richard C. Witte; Thomas H. O'Flaherty

[57] ABSTRACT

Detergent compositions containing aluminosilicate ion exchange materials as builders are provided. The aluminosilicate builders are characterized by the speed and efficiency with which they remove hardness ions from water.

2 Claims, No Drawings

DETERGENT COMPOSITION

CROSS-REFERENCE TO RELATED APPLICATION

This is a division of application Ser. No. 450,266, filed Mar. 11, 1974, which is a continuation-in-part of U.S. Ser. No. 359,293 filed May 11, 1973, which is now abandoned.

BACKGROUND OF THE INVENTION

It has long been recognized that laundry compositions function more efficiently in soft water than in water containing significant amounts of dissolved "hardness" cations such as calcium ion, magnesium ion and the like. Heretofore, laundry water has been softened prior to use, usually by passing the water through columns of zeolite or other cation exchange materials. The use of such zeolitic or other cation exchange materials to presoften water requires a separate tank or appliance wherein the water can be percolated slowly through the ion exchange material to remove the undesirable cations. Such pre-softening procedures require an additional expense to the user occasioned by the need to purchase the softener appliance.

Another means whereby fabrics can be optimally laundered under hard water conditions involves the use of water-soluble builder salts and/or chelators to sequester the undesirable hardness cations and to effectively remove them from interaction with the fabrics and detergent materials in the laundering liquor. However, the use of such water-soluble builders necessarily introduces into the water supply certain materials which, in improperly treated sewerage effluents, may be undesirable. Accordingly, a means for providing water-softening builders in detergent compositions without the need for soluble builder additives is desirable.

A variety of methods have been suggested for providing builder and water-softening action concurrently with the deterging cycle of a home laundering operation, but without the need for water-soluble detergent additives. One such method employs a phosphorylated cloth which can be added to the laundry bath to sequester hardness ions and which can be removed after each laundering; see U.S. Pat. No. 3,424,545.

The use of certain clay minerals to adsorb hardness ions from laundering liquors has also been suggested; see, for example, Rao, in *Soap* Vol. 3 #3 pp. 3–13 (1950); Schwarz, et al. "Surface Active Agents and Detergents", Vol. 2, p. 297 et seq. (1966).

The zeolites, especially the naturally-occurring aluminosilicate zeolites, have been suggested for use in washing compositions; see U.S. Pat. No. 2,213,641; also U.S. Pat. No. 2,264,103.

Various aluminosilicates have been suggested for use as adjuncts to and with detergent compositions; see, for example, U.S. Pat. Nos. 923,850; 1,419,625; and British Pat. Nos. 339,355; 461,103; 462,591; and 522,097.

From the foregoing it is seen that a variety of methods have been heretofore employed to remove hardness cations from aqueous laundering systems concurrently with the deterging cycle of a home laundry operation. However, these methods have not met with general success, primarily due to the inability of the art-disclosed materials to rapidly and efficiently reduce the free polyvalent metal ion content of the aqueous laundering liquor to acceptable hardness levels. To be truly useful in laundry detergent compositions, an ion exchange material must have sufficient cation exchange capacity to significantly decrease the hardness of the laundry bath without requiring excessive amounts of the ion exchanger. Moreover, the ion exchange material must act rapidly, i.e., it must reduce the cation hardness in an aqueous laundry bath to an acceptable level within the limited time (ca. 10–12 minutes) available during the deterging cycle of a home laundering operation. Optimally, effective ion exchange materials should be capable of reducing calcium hardness to about 1 to 2 grains per gallon within the first 1 to 3 minutes of the deterging cycle. Finally, useful cation exchange builders are desirably substantially water-insoluble, inorganic materials which present little or no ecological problems in sewage.

It has now been found that certain aluminosilicate materials have both the high ion exchange capacity and the rapid ion exchange rate needed for cation exchange builder materials in laundry detergent compositions.

Accordingly, it is an object of the present invention to provide detergent compositions containing insoluble, inorganic aluminosilicate ion exchange materials.

It is a further object herein to provide methods for laundering fabrics using the aforesaid detergent compositions.

These and other objects are obtained herein as will be seen from the following disclosure.

SUMMARY OF THE INVENTION

The instant invention is, in part, based on the discovery that cleaning and washing compositions capable of rapidly reducing the free polyvalent metal ion content in laundering liquor can now be prepared comprising a particular water-insoluble aluminosilicate ion exchange material in combination with surface active ingredients. In particular, the compositions of this invention comprise:

(a) from about 5% to about 95% by weight of a water-insoluble aluminosilicate ion exchange material of the formula

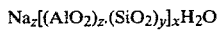

$$Na_z[(AlO_2)_z \cdot (SiO_2)_y] \cdot xH_2O$$

wherein z and y are integers of at least 6; the molar ratio of z to y is in the range from 1.0 to about 0.5, preferably from about 0.8 to 1.0; and x is an integer from about 15 to about 264, preferably about 27; said aluminosilicate ion exchange material having a particle size diameter from about 0.1 micron to about 100 microns; a calcium ion exchange capacity of at least about 200 mg. eg./g.; and a calcium ion exchange rate of at least about 2 grains/gallon/minute/gram; and (b) from about 5% to about 95% by weight of a water-soluble organic surface-active agent selected from the group consisting of anionic, nonionic, ampholytic and zwitterionic surface-active agents and mixtures thereof.

In a preferred embodiment herein, the water-insoluble aluminosilicate ion exchange material has the formula

$$Na_{12}(AlO_2 \cdot SiO_2)_{12} \cdot xH_2O$$

wherein x is an integer of from about 20 to about 30 (preferably about 27).

The detergent compositions herein can contain, in addition to the ion exchange material and organic detergent compound, various other ingredients commonly employed in detergent compositions. In particular, auxiliary, water-soluble builders can be employed in the compositions to aid in the removal of calcium hardness and to sequester magnesium cations in water where dissolved magnesium salts create significant hardness problems.

Additionally, the compositions herein can contain pH adjusting agents to maintain the pH of the laundering liquor within a desired range.

DETAILED DESCRIPTION OF THE INVENTION

The aluminosilicate ion exchange materials herein are prepared by a process which results in the formation of materials which are particularly suitable for use as detergency builders and water softeners. Specifically, the aluminosilicates herein have both a higher calcium ion exchange capacity and a higher exchange rate than similar materials heretofore suggested as detergency builders. Such high calcium ion exchange rate and capacity appear to be a function of several interrelated factors which result from the method of preparing said aluminosilicate ion exchange materials.

One essential feature of the ion exchange builder materials herein is that they be in the "sodium form". That is to say, it has surprisingly been found, for example, that the potassium and hydrogen forms of the instant aluminosilicate exhibit neither the exchange rate nor the exchange capacity necessary for optimal builder use.

A second essential feature of the ion exchange builder materials herein is that they be in a hydrated form, i.e. contain 10%–28%, preferably 10%–22%, by weight of water. Highly preferred aluminosilicates herein contain from about 18% to about 22% (wt.) water in their crystal matrix. It has been found, for example, that less highly hydrated aluminosilicates, e.g. those with about 6% water, do not function effectively as ion exchange builders when employed in the context of a laundry detergent composition.

A third essential feature of the ion exchange builder materials herein is their particle size range. Proper selection of small particle sizes results in fast, highly efficient builder materials.

The method set forth below for preparing the aluminosilicates herein takes into consideration all of the foregoing essential elements. First, the method avoids contamination of the aluminosilicate product by cations other than sodium. For example, product washing steps involving acids or bases other than sodium hydroxide are avoided. Second, the process is designed to form the aluminosilicate in its most highly hydrated form. Hence, high temperature heating and drying are avoided. Third, the process is designed to form the aluminosilicate materials in a finelydivided state having a narrow range of small particle sizes. Of course, additional grinding operations can be employed to still further reduce the particle size. However, the need for such mechanical reduction steps is substantially lessened by the process herein.

The aluminosilicates herein are prepared according to the following procedure:

(a) dissolve sodium aluminate (Na AlO$_2$) in water to form a homogeneous solution having a concentration of Na AlO$_2$ of about 16.5% by weight (preferred);

(b) add sodium hydroxide to the sodium aluminate solution of step (a) at a weight ratio of NaOH:Na AlO$_2$ of 1:1.8 (preferred) and maintain the temperature of the solution at about 50° C. until all the NaOH dissolves and a homogeneous solution forms;

(c) add sodium silicate (Na$_2$ SiO$_3$ having a SiO$_2$:Na$_2$O weight ratio of 3.2 to 1) to the solution of step (b) to provide a solution having a weight ratio of Na$_2$SiO$_3$:NaOH of 1.14:1 and a weight ratio of Na$_2$SiO$_3$:NaAlO$_2$ of 0.63:1, (d) heat the mixture prepared in step (c) to about 90° C.–100° C. and maintain at this temperature range for about one hour.

In a preferred embodiment, the mixture of step (c) is cooled to a temperature below about 25° C., preferably in the range from 17° C. to 23° C., and maintained at that temperature for a period from about 25 hours to about 500 hours, preferably from about 75 hours to about 200 hours.

The mixture resulting from step (d) is cooled to a temperature of about 50° C. and thereafter filtered to collect the desired aluminosilicate solids. If the low temperature ($<25°$ C.) crystallization technique is used, then the precipitate is filtered without additional preparatory steps. The filter cake can optionally be washed free of excess base (deionized water wash preferred to avoid cation contamination). The filter cake is dried to a moisture content of 18%–22% by weight using a temperature below about 150° C. to avoid excessive dehydration. Preferably, the drying is performed at 100° C.–105° C.

Following is a typical pilot-plant scale preparation of the aluminosilicates herein.

PREPARATION OF ALUMINOSILICATE BUILDER

| Component | Pounds (As Is) | Pounds (Anhydrous) | Water | Wt. % of Total |
| --- | --- | --- | --- | --- |
| NaAlO$_2$ | 57.72 | 49.454 | 8.27 | 16.40 (Anh.) |
| Sodium Silicate (3.2:1 SiO$_2$:Na$_2$O) | 82.52 | 30.945 | 51.57 | 10.26 (Anh.) |
| NaOH | 54.96 | 27.304 | 27.66 | 9.05 (Anh.) |
| H$_2$O (deionized) | 106.40 | | 106.40 | 64.29 |

The sodium aluminate was dissolved in the water with stirring and the sodium hydroxide added thereto. The temperature of the mixture was maintained at 50° C. and the sodium silicate was added thereto with stirring. The temperature of the mixture was raised to 90° C.–100° C. and maintained within this range for 1 hour with stirring to allow formation of Na$_{12}$(AlO$_2$.SiO$_2$)$_{12}$.27 H$_2$O. The mixture was cooled to 50° C., filtered, and the filter cake washed twice with 100 lbs. of deionized water. The cake was dried at a temperature of 100° C.–105° C. to a moisture content of 18%–22% by weight to provide the aluminosilicate builder material.

The aluminosilicates prepared in the foregoing manner are characterized by a cubic crystal structure.

Water-insoluble aluminosilicates having a molar ratio of (AlO$_2$):(SiO$_2$) smaller than 1, i.e. in between 1.0 and about 0.5, can be prepared in a similar manner. These aluminosilicate ion exchange materials (AlO$_2$:SiO$_2$<1) are also capable of effectively reducing the free polyvalent hardness metal ion content of an aqueous washing liquor in a manner substantially similar to the aluminosilicate ion exchange material having a molar ratio of AlO$_2$:SiO$_2$=1 as described hereinbefore. Examples of aluminosilicates having a molar ratio: AlO$_2$:SiO$_2$<1, suitable for use in the instant compositions include:

Na$_{86}$[(AlO$_2$)$_{86}$(SiO$_2$)$_{106}$].264H$_2$O; and

Although completely hydrated aluminosilicate ion exchange materials are preferred herein, it is recognized that the partially dehydrated aluminosilicates having the general formula given hereinbefore are also excellently suitable for rapidly and effectively reducing the water hardness during the laundering operation. Of course, in the process of preparing the instant aluminosilicate ion exchange material, reaction-crystallization parameter fluctuations can result in such partially hydrated materials. As pointed out previously, aluminosilicates having about 6% or less water do not function effectively for the intended purpose in laundering context. The suitability of particular partially dehydrated water-insoluble aluminosilicates for use in the compositions of this invention can easily be asserted and does only involve routine testing as, for example, described herein (Ca-ion exchange capacity; rate of exchange).

The ion exchange properties of the aluminosilicates herein can conveniently be determined by means of a calcium ion electrode. In this technique, the rate and capacity of $Ca^{++}$ uptake from an aqueous solution containing a known quantity of $Ca^{++}$ ion is determined as a function of the amount of aluminosilicate ion exchange material added to the solution.

The water-insoluble, inorganic aluminosilicate ion exchange materials prepared in the foregoing manner are characterized by a particle size diameter from about 0.1 micron to about 100 microns. Preferred ion exchange materials have a particle size diameter from about 1 micron to about 10 microns. Additional preferred water-insoluble aluminosilicates herein are characterized by a particle size diameter from about 0.2 microns to about 0.7 microns. The term "particle size diameter" herein represents the average particle size diameter of a given ion exchange material as determined by conventional analytical techniques such as, for example, microscopic determination, scanning electron microscope (SEM).

The aluminosilicate ion exchangers herein are further characterized by their calcium ion exchange capacity, which is at least about 200 mg. equivalent of $CaCO_3$ hardness/gram of aluminosilicate, calculated on an anhydrous basis, and which generally lies within the range of from about 300 mg. eq./g. to about 352 mg. eq./g.

The ion exchange materials herein are still further characterized by their calcium ion exchange rate, which is at least about 2 grains ($Ca^{++}$)/gallon/minute/gram of aluminosilicate (anhydrous basis), and lies within the range of about 2 grains/gallon/minute/gram to about 6 grains/gallon/minute/gram, based on calcium ion hardness. Optimum aluminosilicates for builder purposes exhibit a $Ca^{++}$ exchange rate of at least about 4 grains/gallon/minute/gram.

The foregoing procedure for preparing the aluminosilicate ion exchange materials herein can be modified in its various process steps, as follows.

Step (a) can be modified by using solution concentrations of $NaAlO_2$ of from 5% to 22% by weight; the optimum concentration is 16% to 16.5%. Step (b) can be modified by deletion of the NaOH. Sodium hydroxide is not required to form the aluminosilicates herein but its use is preferred to initiate the reaction and to maintain reaction efficiency. Step (b) can be further modified by use of temperatures within the range of from about 30° C. to about 100° C.; 50° C. is preferred. Step (c) can be modified by varying the ratio of aluminate to silicate. In order to satisfy the 1:1 $AlO_2:SiO_2$ stoichiometry requirements of a specifically preferred species in the final product, it is necessary to provide in that particular case at least a 1:1 mole ratio of $AlO_2:SiO_2$ (based on $NaAlO_2$ and $Na_2SiO_3$) in the mix. In that latter event, it is highly preferred to employ an excess of $NaAlO_2$, inasmuch as excess $NaAlO_2$ has been found to promote the rate and efficiency of the formation reaction of aluminosilicates having a 1:1 molar ratio of $AlO_2:SiO_2$. Suitable water-insoluble aluminosilicate ion exchange materials having a molar ratio of $AlO_2:SiO_2$ of less than about 1.0, i.e. from 1.0 to about 0.5, can be prepared as described hereinbefore except that the molar amount of $SiO_2$ is increased. The proper determination of the excess silicate to be used in the formation reaction can easily be optimized and does only require a routine investigation.

Step (d) can be modified to employ temperatures from 50° C. to 110° C. at ambient pressures; 90° C. to 100° C. is optimal. Of course, higher temperatures can be employed if high pressure equipment is used to prepare the aluminosilicates. When the high-temperature (90°–100° C.) crystallization technique is used, step (d) will normally require a formation reaction time of about 1 to 3 hours. As noted hereinbefore, an additional possibility for preparing the ion exchange materials resides in modifying step (d) by cooling the mixture of step (c) to a temperature below about 25° C., preferably in the range from 17° C.–23° C., and maintaining said mixture at that temperature for a period from about 25 hours to 500 hours, preferably from about 75 hours to about 200 hours.

Following the formation of the aluminosilicates by the foregoing procedure, the materials are recovered and dried. When employed as ion exchange builders, the aluminosilicates must be in a highly hydrated form, i.e. 10% to 28%, preferably 10% to 22%, by weight of water. Accordingly, drying of the aluminosilicates must be carried out under controlled temperature conditions. Drying temperatures of from about 90° C. to about 175° C. can be employed. However, at drying temperatures from about 150° C. to about 175° C., the less highly hydrated materials (ca. 10% $H_2O$) are obtained. Accordingly, it is preferred to dry the aluminosilicates at 100° C. to 105° C., whereby the optimum builder materials containing 18% to 22% by weight of water are secured. At these latter temperatures, the stability of the preferred 27-hydrate form of the aluminosilicate is independent of drying time.

The ion exchange materials prepared in the foregoing manner can be employed in laundering liquors at levels of from about 0.005% to about 0.25% by weight of the liquor, and reduce the hardness level, particularly calcium hardness, to a range of about 1 to 3 grains/gallon within about 1 to about 3 minutes. Of course, the usage level will depend on the original hardness of the water and the desires of the user. Highly preferred detergent compositions herein comprise from about 20% to about 50% by weight of the aluminosilicate builder and from about 15% to about 50% by weight of the water-soluble, organic detergent compound. In another highly preferred embodiment, the compositions herein comprise from about 10% to about 50% by weight of the aluminosilicate builder.

DETERGENT COMPONENT

The detergent compositions of the instant invention can contain all manner of organic, water-soluble detergent compounds, inasmuch as the aluminosilicate ion exchangers are compatible with all such materials. A typical listing of the classes and species of detergent compounds useful herein appears in U.S. Pat. No. 3,664,961, incorporated herein by reference. The following list of detergent compounds and mixtures which can be used in the instant compositions is representative of such materials, but is not intended to be limiting.

Water-soluble salts of the higher fatty acids, i.e. "soaps", are useful as the detergent component of the compositions herein. This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e. sodium or potassium tallow and coconut soap.

Another class of detergents includes water-soluble salts, particularly the alkali metal, ammonium and alkylolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic detergents which form a part of the detergent compositions of the present invention are the sodium and potassium alkyl sulfates, especially those obtained by sulfating the higher alcohols ($C_8$–$C_{18}$ carbon atoms) produced by reducing the glycerides of tallow or coconut oil; and sodium and potassium alkyl benzene sulfonates, in which the alkyl group contains from about 9 to about 15 carbon atoms, in straight chain or branched chain configuration, e.g. those of the type described in U.S. Pat. Nos. 2,220,099 and 2,477,383. Especially valuable are linear straight chain alkyl benzene sulfonates in which the average of the alkyl groups is about 13 carbon atoms, abbreviated as $C_{13}$ LAS.

Other anionic detergent compounds herein include the sodium alkyl glyceryl ether sulfonates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing about 1 to about 10 units of ethylene oxide per molecule and wherein the alkyl groups contain about 8 to about 12 carbon atoms.

Water-soluble nonionic synthetic detergents are also useful as the detergent component of the instant composition. Such nonionic detergent materials can be broadly defined as compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

For example, a well-known class of nonionic synthetic detergents is made available on the market under the trade name of "Pluronic." These compounds are formed by condensing ethylene oxide with a hydrophobic base formed by the condensation of propylene oxide with propylene glycol. Other suitable nonionic synthetic detergents include the polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol.

The water-soluble condensation products of aliphatic alcohols having from 8 to 22 carbon atoms, in either straight chain or branched configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms, are also useful nonionic detergents herein.

Semi-polar nonionic detergents include water-soluble amine oxides containing one alkyl moiety of from about 10 to 28 carbon atoms and 2 moieties selected from the group consisting of alkyl groups and hydroxyalkyl groups containing from 1 to about 3 carbon atoms; water-soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water-soluble sulfoxide detergents containing one alkyl moiety of from about 10 to 28 carbon atoms and a moiety selected from the group consisting of alkyl and hydroxyalkyl moieties of from 1 to 3 carbon atoms.

Ampholytic detergents include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic detergents include derivatives of aliphatic quaternary ammonium, phosphonium and sulfonium compounds in which the aliphatic moieties can be straight chain or branched, and wherein one of the aliphatic substituents contains from about 8 to 18 carbon atoms and one contains an anionic water solubilizing group.

Other useful detergent compounds herein include the water-soluble salts of esters of α-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and β-alkyloxy alkane sulfonates containing from about 1 to 3 carbon atoms in the alkyl group and from about 8 to 20 carbon atoms in the alkane moiety.

Preferred water-soluble organic detergent compounds herein include linear alkyl benzene sulfonates containing from about 11 to 14 carbon atoms in the alkyl group; the tallow range alkyl sulfates; the coconut alkyl glyceryl sulfonates; alkyl ether sulfates wherein the alkyl moiety contains from about 14 to 18 carbon atoms and wherein the average degree of ethoxylation varies between 1 and 6; the sulfated condensation products of tallow alcohol with from about 3 to 10 moles of ethylene oxide; olefin sulfonates containing from about 14 to 16 carbon atoms; alkyl dimethyl amine oxides wherein the alkyl group contains from about 11 to 16 carbon atoms; alkyldimethyl-ammonio-propane-sulfonates and alkyl-dimethyl-ammonio-hydroxy-propane-sulfonates wherein the alkyl group in both types contains from about 14 to 18 carbon atoms; soaps, as hereinabove defined; the condensation product of tallow fatty alcohol with about 11 moles of ethylene oxide; and the condensation product of a $C_{13}$ (avg.) secondary alcohol with 9 moles of ethylene oxide.

Specific preferred detergents for use herein include: sodium linear $C_{10}$–$C_{18}$ alkyl benzene sulfonate; triethanolamine $C_{10}$–$C_{18}$ alkyl benzene sulfonate; sodium tallow alkyl sulfate; sodium coconut alkyl glyceryl ether sulfonate; the sodium salt of a sulfated condensation product of a tallow alcohol with from about 3 to about 10 moles of ethylene oxide; the condensation product of a coconut fatty alcohol with about 6 moles of ethylene oxide; the condensation product of tallow fatty alcohol with about 11 moles of ethylene oxide; 3-(N,N-dimethyl-N-coconutalkylammonio)-2-hydroxypropane-1-sulfonate; 3-(N,N-dimethyl-N-coconutalkylammonio-propane-1-sulfonate; 6-(N-dodecylbenzyl-N,N-dimethylammonio)hexanoate; dodecyl dimethyl amine oxide; coconut alkyl dimethyl amine oxide; and the water-soluble sodium and potassium salts of higher fatty acids containing 8 to 24 carbon atoms.

It is to be recognized that any of the foregoing detergents can be used separately herein or as mixtures. Examples of preferred detergent mixtures herein are as follows.

An especially preferred alkyl ether sulfate detergent component of the instant compositions is a mixture of alkyl ether sulfates, said mixture having an average (arithmetic mean) carbon chain length within the range of from about 12 to 16 carbon atoms, preferably from about 14 to 15 carbon atoms, and an average (arithmetic mean) degree of ethoxylation of from about 1 to 4 moles of ethylene oxide, preferably from about 2 to 3 moles of ethylene oxide; see copending application of Jacobsen and Krummel, Ser. No. 306,330, filed Nov. 13, 1972, incorporated herein by reference.

Specifically, such preferred mixtures comprise from about 0.05% to 5% by weight of mixture of $C_{12-13}$ compounds, from about 55% to 70% by weight of mixture of $C_{14-15}$ compounds, from about 25% to 40% by weight of mixture of $C_{16-17}$ compounds and from about 0.1% to 5% by weight of mixture of $C_{18-19}$ compounds. Further, such preferred alkyl ether sulfate mixtures comprise from about 15% to 25% by weight of mixtures of compounds having a degree of ethoxylation of 0, from about 50% to 65% by weight of mixture of compounds having a degree of ethoxylation from 1 to 4, from about 12% to 22% by weight of mixture of compounds having a degree of ethoxylation from 5 to 8 and from about 0.5% to 10% by weight of mixture of compounds having a degree of ethoxylation greater than 8.

Examples of alkyl ether sulfate mixtures falling within the above-specified ranges are set forth in Table I.

TABLE I

| MIXTURE CHARACTERISTIC | ALKYL | ETHER | SULFATE | MIXTURE |
|---|---|---|---|---|
|  | I | II | III | IV |
| Average carbon chain Length (No. C Atoms) | 14.86 | 14.68 | 14.86 | 14.88 |
| 12–13 carbon atoms (wt. %) | 4% | 1% | 1% | 3% |
| 14–15 carbon atoms (wt. %) | 55% | 65% | 65% | 57% |
| 16–17 carbon atoms (wt. %) | 36% | 33% | 33% | 38% |
| 18–19 carbon atoms (wt. %) | 5% | 1% | 1% | 2% |
| Average degree of ethoxylation (No. Moles EO) | 1.98 | 2.25 | 2.25 | 3.0 |
| 0 moles ethylene oxide (wt. %) | 15% | 21% | 22.9% | 18% |
| 1–4 moles ethylene oxide (wt. %) | 63% | 59% | 65% | 55% |
| 5–8 moles ethylene oxide (wt. %) | 21% | 17% | 12% | 22% |
| 9+ moles ethylene oxide (wt. %) | 1% | 3% | 0.1% | 5% |
| Salt | K | Na | Na | Na |

Preferred "olefin sulfonate" detergent mixtures utilizable herein comprise olefin sulfonates containing from about 10 to about 24 carbon atoms. Such materials can be produced by sulfonation of α-olefins by means of uncomplexed sulfur dioxide followed by neutralization under conditions such that any sultones present are hydrolyzed to the corresponding hydroxy-alkane sulfonates. The α-olefin starting materials preferably have from 14 to 16 carbon atoms. Said preferred α-olefin sulfonates are described in U.S. Pat. No. 3,332,880, incorporated herein by reference.

Preferred α-olefin sulfonate mixtures herein consist essentially of from about 30% to about 70% by weight of a Component A, from about 20% to about 70% by weight of a Component B, and from about 2% to about 15% of a Component C, wherein (a) said Component A is a mixture of double-bond positional isomers of water-soluble salts of alkene-1-sulfonic acids containing from about 10 to about 24 carbon atoms, said mixture of positional isomers including about 10% to about 25% of an alpha-beta unsaturated isomer, about 30% to about 70% of a beta-gamma unsaturated isomer, about 5% to about 25% of gamma-delta unsaturated isomer, and about 5% to about 10% of a delta-epsilon unsaturated isomer;

(b) said Component B is a mixture of water-soluble salts of bifunctionally-substituted sulfur-containing saturated aliphatic compounds containing from about 10 to about 24 carbon atoms, the functional units being hydroxy and sulfonate groups with the sulfonate groups always being on the terminal carbon and the hydroxyl group being attached to a carbon atom at least two carbon atoms removed from the terminal carbon atoms at least 90% of the hydroxy group substitutions being in 3, 4, and 5 positions; and (c) said Component C is a mixture comprising from about 30%–95% water-soluble salts of alkene disulfonates containing from about 10 to about 24 carbon atoms, and from about 5% to about 70% water-soluble salts of hydroxy disulfonates containing from about 10 to about 24 carbon atoms, said alkene disulfonates containing a sulfonate group attached to a terminal carbon atom and a second sulfonate group attached to an internal carbon atom not more than about six carbon atoms removed from said terminal carbon atom, the alkene double bond being distributed between the terminal carbon atom and about the seventh carbon atom, said hydroxy disulfonates being saturated aliphatic compounds having a sulfonate group attached to a terminal carbon, a second sulfonate group attached to an internal carbon atom not more than about six carbon atoms removed from said terminal carbon atom, and a hydroxy group attached to a carbon atom which is not more than about four carbon atoms removed from the site of attachment of said second sulfonate group.

AUXILIARY BUILDERS

As noted hereinabove, the detergent compositions of the present invention can contain, in addition to the aluminosilicate ion exchange builders, auxiliary, water-soluble builders such as those taught for use in detergent compositions. Such auxiliary builders can be employed to aid in the sequestration of hardness ions and are particularly useful in combination with the aluminosilicate ion exchange builders in situations where magnesium ions contribute significantly to water hardness. Such auxiliary builders can be employed in concentrations of from about 5% to about 50% by weight, preferably from about 10% to about 35% by weight, of the detergent compositions herein to provide their auxiliary builder activity. The auxiliary builders herein include any of the conventional inorganic and organic water-soluble builder salts.

Such auxiliary builders can be, for example, water-soluble salts of phosphates, pyrophosphates, orthophosphates, polyphosphates, phosphonates, carbonates, polyhydroxysulfonates, silicates, polyacetates, carboxylates, polycarboxylates and succinates. Specific examples of inorganic phosphate builders include sodium and potassium tripolyphosphates, pyrophosphates, phosphates, and hexametaphosphates. The polyphosphonates specifically include, for example, the sodium and potassium salts of ethylene diphosphonic acid, the sodium and potassium salts of ethane 1-hydroxy-1,1-diphosphonic acid and the sodium and potassium salts of ethane-1,1,2-triphosphonic acid. Examples of these and other phosphorus builder compounds are disclosed in U.S. Pat. Nos. 3,159,581, 3,213,030, 3,422,021, 3,422,137, 3,400,176 and 3,400,148, incorporated herein by reference.

Non-phosphorus containing sequestrants can also be selected for use herein as auxiliary builders.

Specific examples of non-phosphorus, inorganic auxiliary detergent builder ingredients include water-soluble inorganic carbonate, bicarbonate, and silicate salts. The alkali metal, e.g., sodium and potassium, carbonates, bicarbonates, and silicates are particularly useful herein.

Water-soluble, organic auxiliary builders are also useful herein. For example, the alkali metal, ammonium and substituted ammonium polyacetates, carboxylates, polycarboxylates and polyhydroxysulfonates are useful auxiliary builders in the present compositions. Specific examples of the polyacetate and polycarboxylate builder salts include sodium, potassium, lithium, ammonium and substituted ammonium salts of ethylene diamine tetraacetic acid nitrilotriacetic acid, oxydisuccinic acid, mellitic acid, benzene polycarboxylic acids, and citric acid.

Highly preferred non-phosphorus auxiliary builder materials herein include sodium carbonate, sodium bicarbonate, sodium silicate, sodium citrate, sodium oxydisuccinate, sodium mellitate, sodium nitrilotriacetate, and sodium ethylenediaminetetraacetate, and mixtures thereof.

Other highly preferred auxiliary builders herein are the polycarboxylate builders set forth in U.S. Pat. No. 3,308,067, Diehl, incorporated herein by reference. Examples of such materials include the water-soluble salts of homo- and co-polymers of aliphatic carboxylic acids such as maleic acid, itaconic acid, mesaconic acid, fumaric acid, aconitic acid, citraconic acid, methylenemalonic acid, 1,1,2,2-ethane tetracarboxylic acid dihydroxy tartaric acid and keto-malonic acid.

Additional, preferred auxiliary builders herein include the water-soluble salts, especially the sodium and potassium salts, of carboxymethyloxymalonate, carboxymethyloxysuccinate, cis-cyclohexanehexacarboxylate, cis-cyclopentanetetracarboxylate and phloroglucinol trisulfonate.

Specific examples of highly preferred phosphorus containing auxiliary builder salts for use herein include alkali pyrophosphates whereby the weight ratio of ion exchange material to pyrophosphate is within the range from about 1:2 to about 2:1. Additional preferred auxiliary co-builders such as the alkali salts of sodium tripolyphosphates and nitrilotriacetic acid provide equally superior performance for a weight ratio of ion exchange material to auxiliary builder salt in the range from about 1:1 to about 1:3. The ion exchange aluminosilicates in combination with citrate auxiliary builder salts will provide superior free metal ion depletion in washing liquor when the zeolites used have a molar ratio of $AlO_2:SiO_2$ of 1:1. It is understood that in the above preferred ranges of auxiliary builder to aluminosilicate the builder component can be represented by mixtures of said builders.

The detergent compositions herein containing the aluminosilicate ion exchange builder and the auxiliary, water-soluble builder are useful by virtue of the fact that the aluminosilicate preferentially adsorbs calcium ion in the presence of the auxiliary builder material. Accordingly, the calcium hardness ions are primarily removed from solution by the aluminosilicate while the auxiliary builder remains free to sequester other polyvalent hardness ions, such as magnesium and iron ions.

The detergent compositions herein can contain all manner of additional materials commonly found in laundering and cleaning compositions. For example, such compositions can contain thickeners and soil suspending agents such as carboxymethylcellulose and the like. Enzymes, especially the proteolytic and lipolytic enzymes commonly used in laundry detergent compositions, can also be present herein. Various perfumes, optical bleaches, fillers, anti-caking agents, fabric softeners and the like can be present in the compositions to provide the usual benefits occasioned by the use of such materials in detergent compositions. It is to be recognized that all such adjuvant materials are useful herein inasmuch as they are compatible and stable in the presence of the aluminosilicate ion exchange builders.

The granular detergent compositions herein can also advantageously contain a peroxy bleaching component in an amount from about 3% to about 40% by weight, preferably from about 8% to about 33% by weight. Examples of suitable peroxy bleach components for use herein include perborates, persulfates, persilicates, perphosphates, percarbonates and more in general all inorganic and organic peroxy bleaching agents which are known to be adapted for use in the subject compositions.

The detergent compositions of this invention can be prepared by any of the several well known procedures for preparing commercial detergent compositions. For example, the compositions can be prepared by simply admixing the aluminosilicate ion exchange material with the water-soluble organic detergent compound. The adjuvant builder material and optional ingredients can be simply admixed therewith, as desired. Alternatively, an aqueous slurry of the aluminosilicate ion exchange builder containing the dissolved, water-soluble organic detergent compound and the optional and auxiliary materials can be spray-dried in a tower to provide a granular composition. The granules of such spray-dried detergent compositions contain the aluminosilicate ion exchange builder, the organic detergent compound and the optional and auxiliary materials.

Alternatively, the aluminosilicate ion exchange materials herein can be employed separately in aqueous laundry and/or rinse baths to reduce hardness cations. When so employed, the user can simply admix an effective amount, i.e., an amount sufficient to lower the hardness to about 1 to 2 grains per gallon, to the aqueous bath and thereafter add any commercial detergent composition of choice. Generally, when employed in this manner the aluminosilicate will be added at a rate of about 0.005% to about 0.25% by weight of the aqueous bath.

The ion exchange aluminosilicates herein can also be employed in combination with standard cationic fabric softeners in fabric rinses. When so employed, the aluminosilicates remove the hardness cations and result in a softer feel on the softened fabrics. Typical cationic fabric softeners useful in combination with the aluminosilicate ion exchangers include tallowtrimethylammonium bromide, tallowtrimethylammonium chloride, ditallowdimethylammonium bromide, and ditallowdimethylammonium chloride. Aqueous fabric softener compositions containing the aluminosilicate ion exchangers comprise from about 5% to about 95% by weight of the aluminosilicate and from about 1% to about 35% by weight of the cationic fabric softener.

The detergent compositions herein are employed in aqueous liquors to cleanse surfaces, especially fabric surfaces, using any of the standard laundering and cleansing techniques. For example, the compositions herein are particularly suited for use in standard automatic washing machines at concentrations of from about 0.01% to about 0.50% by weight. Optimal results are obtained when the compositions herein are employed in an aqueous laundry bath at a level of at least about 0.10% by weight. As in the case of most commercial laundry detergent compositions, the dry compositions herein are usually added to a conventional aqueous laundry solution at a rate of about 1.0 cup/17 gallons of wash water.

While the aluminosilicate ion exchange builder materials herein function to remove calcium hardness ions over a wide pH range, it is preferred that detergent compositions containing such materials have a pH in the range of from about 8.0 to about 11, preferably about 9.5 to about 10.2. As in the case of other standard detergent compositions, the compositions herein function optimally within the basic pH range to remove soils and triglyceride soils and stains. While the aluminosilicates herein inherently provide a basic solution, the detergent compositions comprising the aluminosilicate and the organic detergent compound can additionally contain from about 5% to about 25% by weight of a pH adjusting agent. Such compositions can, of course, contain the auxiliary builder materials and optional ingredients as hereinbefore described. The pH adjusting agent used in such compositions are selected such that the pH of a 0.05% by weight aqueous mixture of said composition is in the range of from about 9.5 to about 10.2.

The optional pH adjusting agents useful herein include any of the water-soluble, basic materials commonly employed in detergent compositions. Typical examples of such water-soluble materials include the sodium phosphates; sodium silicates, especially those having a silicon dioxide:sodium oxide weight ratio of from about 1:1 to about 1:3.2, preferably from about 1:1.7 to about 1:2.3; sodium hydroxide; potassium hydroxide; triethanolamine; diethanolamine; ammonium hydroxide and the like. Preferred pH adjusting agents herein include sodium hydroxide, triethanolamine and sodium silicate.

The following examples are typical of the detergent compositions herein, but are not intended to be limiting thereof.

EXAMPLE I

A spray-dried detergent composition is prepared having the following composition:

| Component | | Wt. % |
|---|---|---|
| Surfactant system comprising: | | 22% |
| Sodium tallow alkyl sulfate | 18% | |
| Condensation product of one mole of a secondary fatty alcohol containing about 15 carbon atoms with about 9 moles of ethylene oxide | 4% | wt. ratio anionic/ nonionic = 4.5:1 |
| *$Na_{12}(AlO_2 \cdot SiO_2)_{12} \cdot 27 H_2O$ | | 74% |
| Water | | 4% |

*Prepared in the manner disclosed hereinabove; 5 micron average diameter.

The foregoing composition provides excellent fabric laundering performance when employed under conventional home laundering conditions in a laundering liquor of 7 grains gallon hardness with a composition concentration in the laundering liquor of about 0.12% by weight. Under such conditions sudsing and cleansing performance of the Example I composition compares favorably with that of conventional, fully built, high-sudsing anionic detergent formulations. Such a composition is pourable and is prepared with conventional spray-drying apparatus.

Compositions of substantially similar performance quality are secured when, in the above-described Example I composition, the sodium tallow alkyl sulfate is replaced with an equivalent amount of potassium tallow alkyl sulfate, sodium coconut alkyl sulfate, potassium coconut alkyl sulfate, sodium decyl benzene sulfonate, sodium undecyl benzene sulfonate, sodium tridecyl benzene sulfonate, sodium tetradecyl benzene sulfonate, sodium tetrapropylene benzene sulfonate, potassium decyl benzene sulfonate, potassium undecyl benzene sulfonate, potassium tridecyl benzene sulfonate, potassium tetradecyl benzene sulfonate and potassium tetrapropylene benzene sulfonate, respectively.

Compositions of substantially similar performance quality, physical characteristics and processability are secured when, in the above-described Example I composition, the condensation product of the 15 carbon atom secondary alcohol with 9 moles of ethylene oxide is replaced with an equivalent amount of the condensation product of tridecyl; alcohol with about 6 moles of ethylene oxide (HLB=11.4); the condensation product of coconut fatty alcohol with about 6 moles of ethylene oxide (HLB=12.0); Neodol 23-6.5 (HLB=12); Neodol 25-9 (HLB=13.1); and Tergitol 15-S-9 (HLB=13.3), respectively.

EXAMPLE II

A spray-dried detergent composition useful in water containing both $Ca^{++}$ and $Mg^{++}$ hardness is prepared having the following composition:

| Component | Wt. % | | |
|---|---|---|---|
| Surfactant system comprising: | | | 24.7% |
| Sodium linear alkyl benzene sulfonate wherein the alkyl group averages about 11.8 carbon atoms in length | 20% | wt. ratio anionic/ nonionic = 4.26:1 | |
| Condensation product of one mole of coconut fatty alcohol with about 6 moles of ethylene oxide | 4.7% | | |
| *$Na_{12}(AlO_2 . SiO_2)_{12} . 27 H_2O$ | | | 25.0% |
| Sodium silicate ($Na_2O/SiO_2$ wt. ratio = 1:2.4) | | | 15.0% |
| Sodium citrate | | | 20.0% |
| Sodium Acetate | | | 5.0% |
| Sodium toluene sulfonate | | | 2.0% |
| Water | | | 4.0% |
| Minors | | | Balance |

*Prepared in the manner disclosed hereinabove.
Average particle diameter 7.5 microns.

The composition of Example II provides excellent fabric cleansing performance when employed under conventional home laundering conditions in a laundering liquor of 7 grains/gallon mixed $Ca^{++}$ and $Mg^{++}$ hardness with a composition concentration in said laundering liquor of about 0.12% by weight. The composition pH in solution is ca. 10.2 at this concentration. Under such conditions, sudsing performance of the Example II composition compares favorably with that of conventional, fully-built, high-sudsing anionic detergent formulations. Such a composition is readily pourable and storage stable and is prepared with conventional spray-drying apparatus.

Compositions of substantially similar performance quality, physical characteristics and processability are secured when, in the above composition, the sodium citrate is replaced by an equivalent amount of sodium tripolyphosphate, sodium carbonate, sodium bicarbonate, sodium silicate, sodium oxydisuccinate, sodium mellitate, sodium nitrilotriacetate, sodium ethylenediaminetetraacetate, sodium polymaleate, sodium polyitaconate, sodium polymesaconate, sodium polyfumarate, sodium polyaconitate, sodium polycitraconate, sodium polymethylenemalonate, and mixtures thereof, respectively.

A composition of substantially similar performance quality, physical characteristics and processability is secured when, in the above described Example II composition, there is incorporated about 3% by weight of sodium perborate solids with all other components remaining in the same relative proportions. Such perborate compositions are particularly adapted for use under the washing conditions commonly encountered in Europe.

In the above composition the total surfactant system is replaced by an equivalent amount of the alkyl ether sulfate mixtures, I, II, III and IV appearing in Table I, respectively,, and excellent detergency performance is secured.

In the above composition the $Na_{12}(AlO_2.SiO_2)_{12}.27-H_2O$ is replaced with $Na_{12}(AlO_2.SiO_2)_{12}.20H_2O$ and $Na_{12}(Al_2.SiO_2)_{12}.30H_2O$, respectively, and equivalent results are secured.

EXAMPLE III

A phosphorus-free detergent composition is prepared having the following composition:

| Component | Wt. % |
|---|---|
| *Surfactant System | 35% |
| Triethanolamine (pH-adjusting agent) | 7% |
| NaOH (pH-adjusting agent) | 0.5% |
| **$Na_{12}(AlO_2 . SiO_2)_{12} . 27 H_2O$ | 35% |
| Sodium Citrate | 15% |
| Water and Minors | Balance |

*The Surfactant System comprises an α-olefin sulfonate mixture consisting essentially of from about 30% to about 70% by weight of a Component A, from about 20% to about 70% by weight of a Component B, and from about 2% to about 15% of a Component C, wherein
(a) said Component A is a mixture of double-bond positional isomers of water-soluble salts of alkene-1-sulfonic acids containing from about 10 to about 24 carbon atoms, said mixture of positional isomers including about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;
(b) said Component B is a mixture of water-soluble salts of bifunctionally-substituted sulfur-containing saturated aliphatic compounds containing from about 10 to about 24 carbon atoms, the functional units being hydroxy and sulfonate groups with the sulfonate groups always being on the terminal carbon and the hydroxyl group being attached to a carbon atom at least two carbon atoms removed from the terminal carbon atoms, at least 90% of the hydroxy group substitutions being in 3, 4, and 5 positions; and
(c) said Component C is a mixture comprising from about 30%–95% water-soluble salts of alkene disulfonates containing from about 10 to about 24 carbon atoms, and from about 5% to about 70% water-soluble salts of hydroxy disulfonates containing from about 10 to about 24 carbon atoms, said alkene disulfonates containing a sulfonate group attached to a terminal carbon atom and a second sulfonate group attached to an internal carbon atom not more than about six carbon atoms removed from said terminal carbon atom, the alkene double bond being distributed between the terminal carbon atom and about the seventh carbon atom, said hydroxy disulfonates being saturated aliphatic compounds having a sulfonate group attached to a terminal carbon, a second sulfonate group attached to an internal carbon atom not more than about six carbon atoms removed from said terminal carbon atom, and a hydroxy group attached to a carbon atom which is not more than about four carbon atoms removed from the site of attachment of said second sulfonate group.
**Prepared as disclosed hereinabove. Average particle diameter 12 microns.

The composition of Example III is added to an aqueous bath at 110° F. at a rate of 0.15% by weight and used to launder oily fabrics. Excellent cleaning results are secured under initial water hardness conditions of 7–12 gr./gallon mixed hardness.

In the above composition the Surfactant System is replaced by an equivalent amount of sodium linear $C_{10}-C_{18}$ alkyl benzene sulfonate; sodium tallow alkyl sulfate; sodium coconut alkyl glyceryl ether sulfonate; the sodium salt of a sulfated condensation product of a tallow alcohol with from about 3 to about 10 moles of ethylene oxide; the condensation product of a coconut fatty alcohol with about 6 moles of ethylene oxide; the condensation product of tallow fatty alcohol with about 11 moles of ethylene oxide; 3-(N,N-dimethyl-N-coconutalkylammonio)-2-hydroxypropane-1-sulfonate;

3-(N,N-dimethyl-N-coconutalkylammonio-propane-1-sulfonate; 6-(N-dodecylbenzyl-N,N-dimethylammonio)hexanoate; dodecyl dimethyl amine oxide; coconut alkyl dimethyl amine oxide; and the water-soluble sodium and potassium salts of higher fatty acids containing 8 to 24 carbon atoms, and mixtures thereof, respectively, and equivalent results are secured.

In the above composition the Surfactant System is replaced by an equivalent amount of a mixture of alkyl ether sulfate compounds comprising: from about 0.05% to 5% by weight of mixture of $C_{12-13}$ compounds, from about 55% to 70% by weight of mixture of $C_{14-15}$ compounds, from about 25% to 40% by weight of mixture of $C_{16-17}$ compounds, from about 0.1% to 5% by weight of mixture of $C_{18-19}$ compounds, from about 15% to 25% by weight of mixture of compounds having a degree of ethoxylation of 0, from about 50% to 65% by weight of mixture of compounds having a degree of ethoxylation from 1 to 4, from about 12% to 22% by weight of mixture of compounds having a degree of ethoxylation from 5 to 8 and from about 0.5% to 10% by weight of mixture of compounds having a degree of ethoxylation greater than 8, and equivalent results are secured.

In the above composition the sodium citrate is replaced by an equivalent amount of sodium carbonate, sodium bicarbonate, sodium silicate, sodium oxydisuccinate, sodium mellitate, sodium nitrilotriacetate, and the polymeric carboxylates set forth in U.S. Pat. No. 3,308,067, and mixtures thereof, respectively, and effective hard water detergency is secured.

In the above composition the sodium citrate is successively replaced by an equivalent amount of the sodium and potassium salts of carboxymethyloxymalonate, carboxymethyloxysuccinate, cis-cyclohexanehexacarboxylate, cis-cyclopentanetetracarboxylate and phloroglucinol trisulfonate, respectively and effective hard water detergency is secured.

EXAMPLE IV

A soap-based laundry granule is prepared having the following composition:

| Component | Wt. % |
|---|---|
| Sodium soap[1] | 42.6 |
| Potassium soap[1] | 11.2 |
| TAE$_3$S[2] | 10.7 |
| $C_{11.8}$LAS[3] | 8.8 |
| Sodium silicate | 8.9 |
| Sodium citrate | 11.9 |
| Brightener | 0.57 |
| Perfume | 0.17 |
| Water | 3.4 |
| Miscellaneous | Balance |

[1] Soap mixtures comprising 90% tallow and 10% coconut soaps.
[2] Sodium salt of ethoxylated tallow alkyl sulfate having an average of about 3 ethylene oxide units per molecule.
[3] Sodium salt of linear alkyl benzene sulfonate having an average alkyl chain length of about 12 carbon atoms.

Seventy-five parts by weight of the soap-based granules prepared above are admixed with 25 parts by weight of $Na_{12}(AlO_2.SiO_2)_{12}.27H_2O$ (prepared in the manner disclosed hereinabove; 25 micron size). The composition is employed at 0.12% by weight of laundering liquor and provides excellent fabric cleansing and sudsing properties in 10 gr/gallon hard water.

The composition of Example IV is modified by the addition of 3 parts by weight of sodium perborate and excellent hot water (120° F.–180° F.) cleaning performance is secured.

As can be seen by the foregoing, the aluminosilicate ion exchange builder materials herein can be employed in all manner of detergency compositions. Moreover, the aluminosilicate builders in combination with water-soluble auxiliary builders which sequester magnesium, iron and other polyvalent water hardness cations can also be employed in combination with all manner of detergent compositions. Depending upon the desires of the user, it is, of course, useful to add the aluminosilicate builder or aluminosilicate-plus-auxiliary builder materials to a laundry or rinse liquor separately from the detergent compositions. Such separate use provides flexibility in the selection of the detergent composition employed by the user while providing the desirable benefits of the builder materials herein. Separate use of the aluminosilicate builders and aluminosilicate-plus-auxiliary builder compositions herein to soften water are fully contemplated by this invention.

Inasmuch as most hard water contains polyvalent metal ions in addition to calcium ions, the use of the aluminosilicate builders as water softeners is preferably carried out in the presence of an auxiliary builder of the type hereinbefore disclosed. Such auxiliary builders can be any of the phosphorus-containing builders, or, in regions where such builders are unacceptable, any of the hereinabove disclosed non-phosphorus builder materials. The aluminosilicate builders and the auxiliary builders can, of course, be separately added to water to exert their softening function. However, it is more convenient to add such materials simultaneously to the water to be treated. Accordingly, there are provided to the user compositions comprising from about 5% to about 95% by weight of the aluminosilicate builder materials herein, and from about 5% to about 95% by weight of an auxiliary builder of the type hereinabove disclosed. Preferably, such compositions will contain a weight ratio of aluminosilicate builder:auxiliary builder of from about 5:1 to about 1:5. Such compositions can be provided to the user in any of the physical forms convenient for use as laundry builders, such as dry powders, tablets, pre-measured packets, or in water-soluble packages which can simply be added to the aqueous solution to be softened. Various adjunct materials such as bleaches, bluing, fabric softeners, suds control agents, perfumes, sanitizers and the like can be optionally incorporated into such compositions to provide desirable additional benefits.

The highly desirable speed and ion exchange capacity of the aluminosilicate materials herein is readily recognized when such materials are used to presoften laundry liquors. To be suitable for such use, the materials must not be so slow as to require an extensive waiting period prior to addition of a laundry detergent composition to the laundering liquor. Moreover, it is likewise undesirable to require the user to utilize materials of such low ion exchange quantity that an unduly large quantity is required to effectively sequester hardness ions. For these reasons, the aluminosilicates herein are particularly adapted for such builder and water-softening purposes.

The following is an example of a builder composition of this invention which is suitable for use in water containing all manner of polyvalent hardness cations.

EXAMPLE V

| Component | Wt. % |
|---|---|
| *$Na_{12}(AlO_2 \cdot SiO_2)_{12} \cdot 27 H_2O$ | 50 |
| Sodium Citrate | 50 |

*Prepared as described herein. Particle diameter 100 microns.

The above composition is provided as a granular powder. The powder is added at a rate of 2 oz. per 20 gallons of wash water and agitated for ½-minute. During this time, hardness cations are substantially reduced to a level of about 1-2 gr/gal (starting with 7 grain/gallon hard water). A commercial laundry detergent composition is thereafter added to the aqueous bath. Fabrics laundered in such pre-softened water are more effectively cleansed than in water which has not been pre-softened.

In the above composition, the $Na_{12}(AlO_2.SiO_2)_{12}.27\text{-}H_2O$ is replaced by an equivalent amount of $Na_{12}(AlO_2.SiO_2)_{12}.20H_2O$ and $Na_{12}(Al_2.SiO_2)_{12}.30H_2O$, prepared as disclosed herein, respectively, and equivalent results are secured.

In the above composition the sodium citrate is replaced by an equivalent amount of sodium tripolyphosphate, sodium carbonate, sodium bicarbonate, sodium silicate, sodium oxydisuccinate, sodium mellitate, sodium nitrilotriacetate, sodium ethylenediaminetetraacetate, sodium polymaleate, sodium polyitaconate, sodium polymesaconate, sodium polyfumarate, sodium polyaconitate, sodium polycitraconate, sodium polymethylenemalonate, sodium carboxymethyloxymalonate, sodium carboxymethyloxysuccinate, cis-cyclohexanehexacarboxylate, cis-cyclopentanetetracarboxylate, phloroglucinol trisulfonate, and mixtures thereof, respectively, and effective hard water detergency is secured.

The foregoing compositions are employed at concentrations of 0.005% to 0.25% by weight and effectively soften water containing polyvalent cations.

The aluminosilicate builders and aluminosilicate-plus-auxiliary builder mixtures herein are useful in all manner of cleaning compositions. In addition to the foregoing, they can be effectively used in detergent-containing floor cleansers, scouring cleansers and the like, wherein water hardness also presents detergency problems. Typical scouring cleansers can comprise, for example, from about 25% to about 95% by weight of an abrasive (e.g., silica), from about 10% to about 35% by weight of an aluminosilicate builder as disclosed herein, for about 0% to about 20% by weight of an auxiliary builder as disclosed herein, and from about 0.2% to about 10% by weight of an organic detergent compound.

EXAMPLE VI

A detergent base granule having the following composition was prepared by conventional spray-drying.

| Ingredient | Parts by Weight |
|---|---|
| $TAE_3S^{(1)}$ | 14.5 |
| Sodium tallow alkyl sulfate | 2.5 |
| Silicate solids (ratio: $Na_2O/SiO_2 = 2.0$) | 13.0 |
| Sodium sulfate | 15.0 |
| Minor ingredients including sodium toluene sulfonate, trisodium sulfosuccinate, moisture, etc. | 5.0 |

[1] Sodium salt of ethoxylated tallow alkyl sulfate having an average of about 3 ethylene oxide units per molecule.

A mixture was then prepared containing the above detergent base granule and a builder component listed hereinafter in the proportions specified. The composition so obtained was used for cleaning polyester swatches which had been stained with a clay soiling composition. To that end, the swatches were laundered for ten minutes at 105° F. in a laundering liquor containing 0.12% by weight of the above detergent composition. The hardness and calcium-magnesium ratio were varied as indicated. After being laundered, the swatches were rinsed, removed from the washer and dried. The cleaning performance was expressed as a summation of Hunter Whiteness readings for 0, 2, 4, 6, 8, 10 and 12 grains hardness/gallon (Ca/Mg=2/1) whereby the Hunter Whiteness equals 0 when 0.06% by weight sodium sulfate is used instead of the builder mixture and equals 100 when 0.06% by weight sodium tripolyphosphate is used as builder component. The 0.06% replacement level relates to the amount of said ingredients in the laundering liquor.

The builder component was represented by a mixture of an aluminosilicate having the formula $$Na_{12}(AlO_2.SiO_2)_{12}.27.H_2O$$

prepared as described hereinbefore and having an average particle diameter of 3 microns and an auxiliary builder selected from sodium pyrophosphate, sodium tripolyphosphate, sodium nitrilo-triacetate and sodium citrate.

The base detergent granule represented 0.06% by weight of the laundering liquor; the remaining 0.06% by weight was represented by a builder component as indicated. The whiteness results were:

| Aluminosilicate[1] | Sodium Pyrophosphate[1] | Hunter Whiteness |
|---|---|---|
| 0.02 | 0.04 | 117 |
| 0.03 | 0.03 | 102 |
| 0.04 | 0.02 | 94 |

[1] in % by weight of laundering liquor.

Sodium citrate was evaluated as auxiliary builder in lieu of sodium pyrophosphate thereby using the testing conditions set forth. In addition, the Ca/Mg hardness level was varied as indicated. The Hunter Whiteness readings were as follows:

| Ca:Mg | Aluminosilicate[1] | Sodium Citrate[1] | Hunter Whiteness |
|---|---|---|---|
| 1:1 | 0.04 | 0.02 | 35 |
|  | 0.03 | 0.03 | 61 |
|  | 0.02 | 0.04 | 51 |
| 2:1 | 0.04 | 0.02 | 38 |
|  | 0.03 | 0.03 | 52 |
|  | 0.02 | 0.04 | 53 |
| 3:1 | 0.04 | 0.02 | 37 |
|  | 0.03 | 0.03 | 54 |
|  | 0.02 | 0.04 | 50 |

[1] In % by weight of laundering liquor.

The sodium salt of nitrilotriacetic acid and sodium tripolyphosphate were also evaluated as auxiliary builders in substitution for the sodium pyrophosphate builder thereby using the testing conditions set forth above. The Ca:Mg ratio was 2:1. The Hunter Whiteness readings were as follows:

| Alumino-silicate[1] | Sodium-nitrilo triacetate[1] | Sodium tri-polyphosphate[1] | Hunter Whiteness |
|---|---|---|---|
| 0.02 | 0.04 | | 108 |
| 0.03 | 0.03 | | 82 |
| 0.04 | 0.02 | | 64 |
| 0.02 | | 0.04 | 95 |
| 0.03 | | 0.03 | 91 |
| 0.04 | | 0.02 | 79 |

[1] In % by weight of laundering liquor.

The foregoing testing data highlight the superior cleaning performance derived from the use of specific combinations of aluminosilicates and auxiliary builder salts in detergent context.

Compositions capable of providing substantially similar performance are obtained when the sodium salt of the ethoxylated tallow alkyl sulfate is substituted by a substantially equivalent amount of sodium tallow alkyl sulfate, sodium coconut alkyl sulfate and sodium decyl benzene sulfonate.

Substantially similar results are also obtained when the $Na_{12}(AlO_2.SiO_2)_{12}.27H_2O$ is replaced with an equivalent amount of $Na_{12}(AlO_2.SiO_2)_{12}.20H_2O$; $Na_{12}(AlO_2.SiO_2)_{12}.30H_2O$; $Na_{86}[(AlO_2)_{86}(SiO_2)_{106}].264H_2O$; and $Na_6[(AlO_2)_6(SiO_2)_{10}].15H_2O$, respectively.

EXAMPLE VII

A granular detergent composition is provided having the following composition:

| Ingredient | Parts by Weight |
|---|---|
| $TAE_3S$[1] | 14.4 |
| Sodium tallow alkyl sulfate | 2.1 |
| Sodium tripolyphosphate | 24.0 |
| $Na_{12}(AlO_2 . SiO_2)_{12} . 27 H_2O$[2] | 18.0 |
| Sodium sulfate | 36.6 |
| Brightener | 0.9 |
| Moisture | 5.0 |

[1] Sodium salt of ethoxylated tallow alkyl sulfate having an average of about 3 ethylene oxide units per molecule.
[2] Prepared as described herein. Average particle size diameter 3–5 microns.

The above composition is capable of securing excellent soil removal and cleaning performance during conventional laundering when using water having a high initial water hardness, for example from 7 to 14 grains per gallon of Ca/Mg hardness.

What is claimed is:

1. A detergent composition for use as a scouring cleanser and capable of rapidly reducing the free polyvalent metal ion content of an aqueous solution, comprising:
   (a) from about 25% to about 95% by weight of an abrasive;
   (b) from about 10% to about 35% by weight of a water-insoluble crystalline aluminosilicate ion exchange material of the formula $$Na_z[(AlO_2)_z.(SiO_2)_y] \times H_2O$$

wherein z and y are integers of at least 6; the molar ratio of z to y is in the range from 1.0 to about 0.5, and x is an integer from about 15 to about 264; said aluminosilicate ion exchange material having a particle size diameter from about 0.1 micron to about 100 microns; a calcium ion exchange capacity on an anhydrous basis of at least about 200 milligrams equivalent of $CaCO_3$ hardness/gram; and a calcium ion exchange rate on an anhydrous basis of at least about 2 grains/gallon/minute/gram;
   (c) from about 0% to about 20% by weight of an auxiliary builder salt selected from the group consisting of sodium tripolyphosphate, sodium carbonate, sodium bicarbonate, sodium silicate, sodium citrate, sodium oxydisuccinate, sodium mellitate, sodium nitrilotriacetate, sodium ethylenediaminetetraacetate, sodium polymaleate, sodium polyitaconate, sodium polymesaconate, sodium polyfumarate, sodium polyaconitate, sodium polycitraconate, sodium polymethylenemalonate, sodium carboxymethyloxymalonate, sodium carboxymethyloxysuccinate, sodium cis-cyclohexanehexacarboxylate, cis-cyclopentanetetracarboxylate, and sodium phloroglucinol trisulsulphonate; and
   (d) from about 0.2% to about 10% by weight of a water soluble organic surface-active agent selected from the group consisting of anionic, nonionic, ampholytic and zwitterionic surface-active agents and mixtures thereof.

2. The detergent composition of claim 1 wherein said abrasive is silica.

* * * * *